Sept. 15, 1959 J. K. ALLEN 2,904,625

TELEVISION RECEIVER WITH COLOR REFERENCE SOURCE

Filed Feb. 23, 1955

INVENTOR.
JOHN K. ALLEN
BY
Mason, Kolehmainen, Rathburn & Wyss
ATTORNEYS 2,904,625
Patented Sept. 15, 1959

2,904,625

TELEVISION RECEIVER WITH COLOR REFERENCE SOURCE

John K. Allen, Buffalo, N.Y., assignor, by mesne assignments, to Sylvania Electric Products Inc., Wilmington, Del., a corporation of Delaware Application February 23, 1955, Serial No. 489,897

4 Claims. (Cl. 178—5.4)

The present invention relates to television receivers, more particularly to such television receivers as are adapted to produce an image in simulation of its natural colors in response to a received signal, and the invention has for an object the provision of a new and improved color reference source which may be readily and economically incorporated into a competitive type color television receiver so as to facilitate rapid and accurate adjustment thereof.

In order to adjust a color television receiver so that the image reproduced on the screen thereof corresponds to the transmitted image, a test pattern of vertical bars of standard colors is transmitted, usually before transmission of the color program is initiated. The present day color bar test pattern consists of seven vertical bars, the colors of which are respectively white, yellow, cyan, green, magenta, red and blue. To adjust the various controls of the color television receiver properly to reproduce this pattern of vertical color bars, it is necessary to be able to recognize the hue and saturation of the various colors which make up the pattern. It has been discovered, however, that the average person who owns and operates a color television receiver is unable accurately to remember and recognize these characteristics of the color bars in the standard pattern.

In a co-pending application to Joseph E. Davis, now Patent 2,854,505, which is assigned to the same assignee as the present application, there is disclosed a color reference source for incorporation in a color television receiver to facilitate the proper adjustment of the various controls of the color television receiver which determine the hue and saturation of the reproduced color image. In accordance with the teachings in the above-identified application, a plurality of contiguously located color filters are simultaneously illuminated by means of a light source located within the receiver cabinet.

Another object of the present invention is to provide an improved color reference source for a color television receiver wherein a plurality of reference colors may be provided in a reliable and yet more economical manner than has heretofore been known in the art.

A further object of the present invention is to provide a new and improved color reference source for facilitating the adjustment of the controls of a color television receiver and which produces a plurality of high quality, accurate reference colors within a minimum of space and which may be incorporated in a competitive type color television receiver without substantially increasing the manufacturing cost thereof.

Briefly, in accordance with the present invention a plurality of color filter elements are supported on a rotatable support member and a single, low voltage lamp is positioned so as to illuminate a selected one of the color filter elements. Uniform illumination of a selected filter element is thus achieved in a reliable and inexpensive manner and the space occupied by the color calibration source on the receiver cabinet is minimized.

Figures 1, 2, 3, 4, 5:
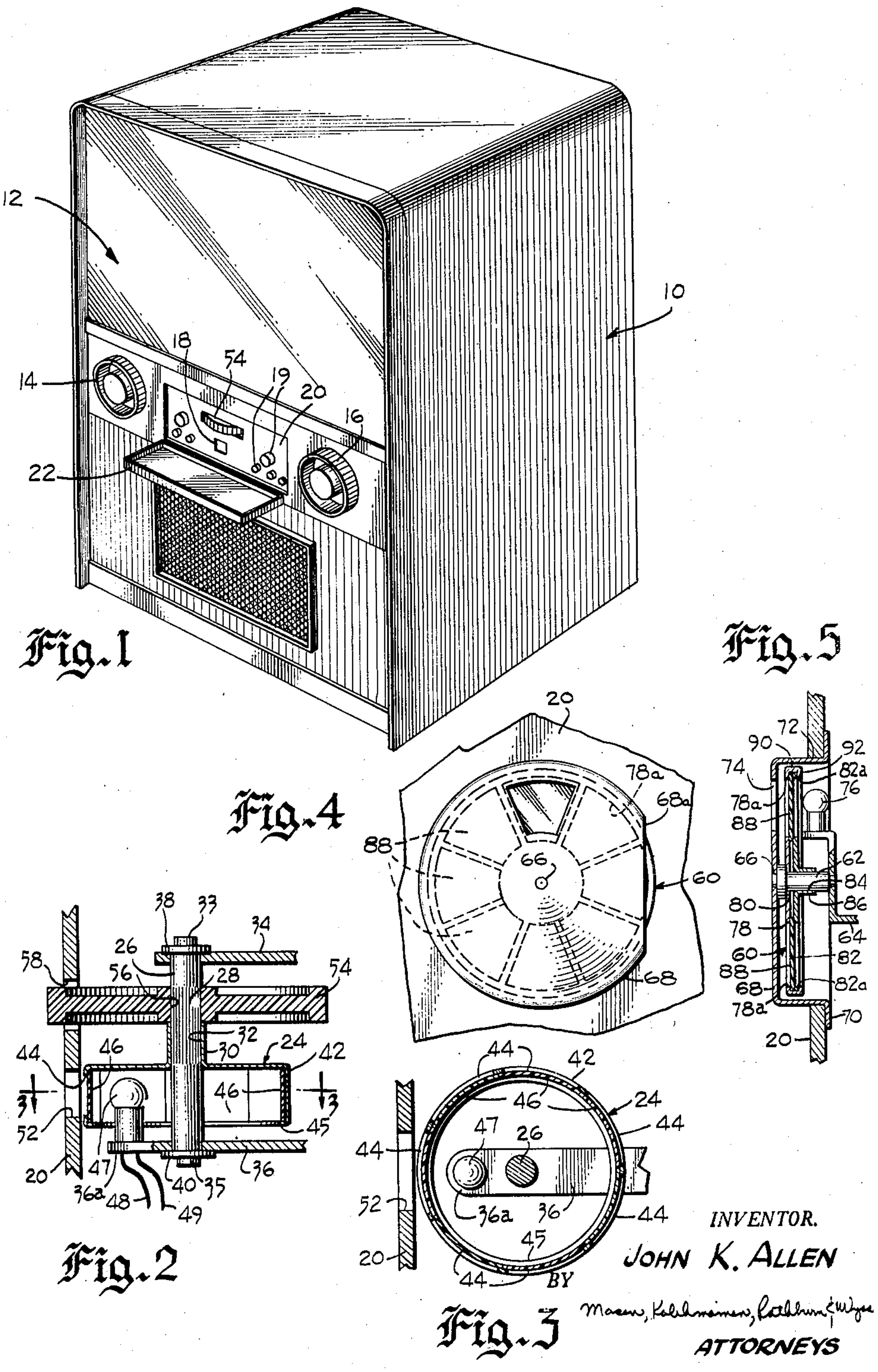
Fig. 1 is a perspective view of a color television receiver in which the color reference source of the present invention is provided on the receiver control panel behind a hinged cover at the approximate front center of the receiver cabinet.
Fig. 2 is a fragmentary, sectional view of one embodiment of the present invention wherein a plurality of individual color filters are mounted for individual viewing on a color drum.
Fig. 3 is a sectional view of the color reference source of Fig. 2 taken along the line 3—3 thereof.
Fig. 4 is a front elevational view of a portion of the control panel of a color television receiver incorporating another embodiment of the present invention wherein the individual color filters are mounted on a rotatable color wheel.
Fig. 5 is a center sectional view of the color source shown in Fig. 4.

Referring now to the drawing and particularly to Figs. 1, 2, and 3, thereof, there is shown a color television receiver cabinet 10 having at the front thereof a window 12 through which the reproduced television image is viewed. A pair of conventional dual control knobs 14 and 16 are provided beneath the window 12 on opposite sides of the control panel 20 which includes a color reference source 18, to be more fully described hereinafter, and a plurality of conventional control knobs 19. A hinged cover member 22 is provided for enclosing the control panel 20 during normal viewing of the televised image.

The color reference source 18 includes a filter supporting cup-like drum 24 which is mounted on a vertically disposed shaft 26 for rotation therewith. The shaft 26 is provided with a knurled portion 28 intermediate the ends thereof, and the drum 24 has an upwardly directed annular flange 30 defining a central aperture 32 through which the shaft 26 extends. The walls of the aperture 32 are serrated so as to coact with the serrations on the knurled portion 28 of the 26 to secure the shaft 26 to the drum 24. The shaft 26 is journaled near the ends thereof in apertures 33 and 35 provided in respective brackets 34 and 36 which are conveniently mounted directly on the television receiver chassis (not shown). A pair of washers 38 and 40 which are secured to the approximate ends of the shaft 26 prevent vertical movement of the shaft 26 relative to the brackets 34 and 36.

The drum 24 is further provided with a downwardly directed annular flange 42 having a plurality of substantially square apertures 44 spaced at equal intervals therein. The outer edge 45 of the flange 42 is bent inwardly to provide a surface in which a plurality of color filters 46 are held while being cemented over individual respective ones of the aperture 44. The filters 46 may, of course, if it is deemed expedient, be secured to the drum 24 across the apertures 44 in any other suitable manner. The filters 46 are, however, preferably selected so as to have light transmission characteristics respectively corresponding to the hues which are contained in the standard color bar test pattern.

A source of illumination 47, which may conveniently be a small incandescent lamp, is energized through a pair of conductors 48 and 49 (only partially shown) and physically supported on a portion 36*a* of the bracket 36 which extends forward of the aperture 35 in which the shaft 26 is journaled. A window 52 is provided in the panel 20 opposite the flange 42 in line with the lamp 47 such that selected ones of the filters 46 are illuminated by the lamp 47 and may be viewed through the window 52 when the cover 20 is opened.

In order to rotate the shaft 26 so as to position a selected one of the filters 46 opposite the window 52, a control disk 54 having a centrally knurled aperture 56 is secured to the shaft 26 and extends forward of the panel 20 through a rectangular slot 58 provided therein. To facilitate manual rotation of the disk 54, the outer periphery thereof is also knurled.

From the foregoing description of the embodiment of the present invention shown in Figs. 1, 2 and 3, it will be understood that in utilizing the color source 18 when a color bar pattern is being televised, individual ones of the filters 46 are positioned in line with the window 52 and the lamp 47, and the television receiver controls are manipulated until the color bars on the receiving screen correspond to the respective hues developed by the reference source 18. Specifically, in utilizing the color source 18 of the present invention in adjusting a television receiver, the chroma control of the receiver may first be set to zero such that no color is present in the image which is reproduced on the receiving screen. The contrast and brightness controls are then adjusted to give the desired background brightness and image contrast. Following these adjustments the chroma control is adjusted so that the bars on the viewing screen become colored. One of the filters 46 is then selected and the phase control of the receiver is adjusted until the hue of the respective color bar matches that of the selected filter. For example, the cyan filter may be first selected and the hue of the third bar is then compared therewith. Other ones of the filters 46 are then selected and the phase control is adjusted until all of the bars in the reproduced image most nearly match the respective ones of the filters 46. The chroma control is then finally adjusted to produce the desired degree of saturation. The latter adjustment may be made so as to provide a degree of color saturation which is most nearly to the liking of the viewers. Because of the wide variation in the degree of saturation preferred by normal viewers, at the present time it would appear to be desirable to provide a reference source wherein relative, rather than absolute values of saturation, are provided. Accordingly, the chroma adjustment is made independent of the reference source 18 except for its affect on the hues of the color bars in the reproduced image.

As is discussed in the hereinbefore mentioned application, if absolute levels of color saturation are desired, the lamp 46 may be connected between points in the color television receiver circuit which are maintained at substantially constant voltage levels irrespective of changes in power line voltage.

Referring to Figs. 4 and 5 of the drawings, there is shown another embodiment of the present invention which may be incorporated in the instrument panel 20 behind the hinged cover 22. A color wheel 60 is secured to a shaft 62 which is rotatably mounted on the receiver chassis (not shown) and is journaled at its forward end in an aperture 66 provided in a cover member 68. The cover member 68 is secured to the cabinet 10 by means of an outwardly directed flange 70 which is provided at the open end thereof and the flange 70 coacts with the back wall of the front panel 20 to maintain the side wall of the cover 68 within an aperture 72 which is provided in the panel 20. The cover 68 is also provided with a window 74 which may be of any desired shape, such, for example, as square, rectangular, or circular and which is aligned with a lamp 76. The lamp 76 is suitably supported on the support bracket 64 above the shaft 62 near the periphery of the color wheel 60.

The color wheel 60 includes a circular forward disk member 78 which is press-fitted on the shaft 62 and has a centrally located aperture 80. A second disk shaped member 82 having a diameter slightly less than that of the disk 78 is provided with a central aperture 84 defined by a rearwardly directed flange 86 which is press fitted on the shaft 62. The disks 78 and 82 are respectively provided with correspondingly positioned apertures 78a and 82a located such that selected ones of the apertures may be aligned with the window 74 and the lamp 76. A plurality of filter elements 88 which are each slightly larger in cross-sectional area than the window 74, and which correspond to filters 46 in the embodiment of Figs. 1 and 2, are interposed between the disks 78 and 82 in register with respective ones of the apertures 78a and 82a, and the outer edge of the forward disk 78 is bent back to form an annular flange 90 having an inwardly directed annular portion 92 for securing the disks 78 and 82 and the filter elements 88 in place. Since the window 74 in the cover member 68 is slightly smaller than the apertures in the color wheel, any one of the color filters may be selected by rotation of the wheel 60 and may be observed through the window 74. In order to facilitate rotation of the color wheel 60 for the selection of the various filters 18, the cover member 68 is cut away at the right hand side thereof such that a portion of the periphery of the disk 78 is exposed. The edge of the disk 78 may be knurled if desired.

The present invention thus enables facile and accurate adjustment of a color television receiver by providing an illuminated source of reference colors which simulate the televised standard color bar pattern. The effect of ambient lighting to change the reference colors so provided is made negligible by the use of rearwardly illuminated filters. In addition, since only a single filter element, which may be relatively small, is illuminated at any one time, a small inexpensive, low power incandescent lamp may be employed for illuminating all of the filters and only a minimum of receiver cabinet space need be occupied.

If it is desired to provide the color source of the present invention at a location at the front of the receiver or at any other place on the receiver cabinet wherein a hinged panel or other cover is not provided, one of the filter elements may be made black or so dense that no light is transmitted therethrough from the source of illumination. Thus, when a normal image is being viewed on the television receiver, and no adjustments are being made, the color wheel or the color drum as the case may be, is positioned such that the black filter is aligned with the source of illumination and the reference source window in the receiver cabinet.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a color television receiver, the combination of a housing having a wall, a color television receiver chassis mounted therein, a color television screen mounted above the chassis and viewable through an aperture in said wall of the housing, a comparison color source mounted in the housing adjacent to the color television screen and viewable through a second aperture in said wall of the housing, said comparison color source comprising: a rotatable support member, a plurality of different color filters spacedly mounted on said support member, means for disposing said rotatable support member within said housing with said color filters being selectively positionable opposite the aforementioned second aperture in the housing, and a light source disposed within said housing behind said support member in substantial alignment with a selected one of said filters and said aperture, and a control disk coupled for movement with said rotatable support member and extending to the exterior of the housing.

2. The apparatus according to claim 1 in which said rotatable support member is a drum and said color filters are mounted with the principal planes thereof parallel to said one wall of the housing.

3. The apparatus according to claim 1 in which said rotatable support member is a color wheel and said color filters are mounted with the principal planes thereof parallel to said one wall of the housing.

4. The apparatus according to claim 1 in which one of said filters is opaque.

References Cited in the file of this patent

UNITED STATES PATENTS

| | | |
|---|---|---|
| 1,582,122 | Clapp | Apr. 27, 1926 |
| 2,030,329 | Simon | Feb. 11, 1936 |
| 2,147,902 | Jakusky | Feb. 21, 1939 |
| 2,248,148 | Wilson | July 8, 1941 |
| 2,648,724 | Enslein | Aug. 11, 1953 |
| 2,668,188 | Naslund | Feb. 2, 1954 |
| 2,854,505 | Davis | Sept. 30, 1958 |